United States Patent
Shigeeda

(10) Patent No.: US 9,838,057 B2
(45) Date of Patent: Dec. 5, 2017

(54) INTER-VEHICLE COMMUNICATION DEVICE

(71) Applicant: Mitsubishi Electric Corporation, Ciyoda-ku, Tokyo (JP)

(72) Inventor: Tetsuya Shigeeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 111 days.

(21) Appl. No.: 14/896,712

(22) PCT Filed: Jun. 10, 2013

(86) PCT No.: PCT/JP2013/065987
§ 371 (c)(1),
(2) Date: Dec. 8, 2015

(87) PCT Pub. No.: WO2014/199431
PCT Pub. Date: Dec. 18, 2014

(65) Prior Publication Data
US 2016/0134319 A1 May 12, 2016

(51) Int. Cl.
| | |
|---|---|
| *B60L 1/00* | (2006.01) |
| *B60L 3/00* | (2006.01) |
| *H02G 3/00* | (2006.01) |
| *H04B 1/3822* | (2015.01) |
| *B60L 15/42* | (2006.01) |

(Continued)

(52) U.S. Cl.
CPC ............ *H04B 1/3822* (2013.01); *B60L 15/42* (2013.01); *B61L 15/0036* (2013.01); *H04B 3/548* (2013.01); *B60L 2200/26* (2013.01); *H04B 2203/547* (2013.01);

(Continued)

(58) Field of Classification Search
USPC .............................................. 307/10.1–10.3
See application file for complete search history.

(56) References Cited

U.S. PATENT DOCUMENTS

2010/0091663 A1    4/2010   Takeyama et al.

FOREIGN PATENT DOCUMENTS

| CN | 101641910 A | 2/2010 |
|---|---|---|
| EP | 2 139 171 A1 | 12/2009 |

(Continued)

OTHER PUBLICATIONS

Extended European Search Report dated Jan. 27, 2017, issued by the European Patent Office in corresponding European Application No. 13886927.6. (10 pages).

(Continued)

*Primary Examiner* — Adam Houston
(74) *Attorney, Agent, or Firm* — Buchanan Ingersoll & Rooney PC

(57) ABSTRACT

An inter-vehicle communication device of a vehicle provided with an electrical coupler that constructs a communication path with another vehicle by using an electric contact with said another vehicle is provided. The inter-vehicle communication device has: a communication control circuit controlling a communication with said another vehicle; a pulse transformer arranged between the communication control circuit and the electrical coupler; and a power supply device arranged between a middle point of the pulse transformer and the electrical coupler to apply a direct-current voltage to the electric contact between the electrical coupler and an electrical coupler of said another vehicle.

11 Claims, 3 Drawing Sheets

(51) Int. Cl.
*H04B 3/54* (2006.01)
*B61L 15/00* (2006.01)
*H04L 12/40* (2006.01)

(52) U.S. Cl.
CPC ............... *H04B 2203/5445* (2013.01); *H04L 2012/40293* (2013.01); *Y02T 90/16* (2013.01)

(56) References Cited

FOREIGN PATENT DOCUMENTS

| | | |
|---|---|---|
| JP | 02-071621 A | 3/1990 |
| JP | 07-294590 A | 11/1995 |
| JP | 2000-193708 A | 7/2000 |
| JP | 2005-010030 A | 1/2005 |
| JP | 2006-232203 A | 9/2006 |
| JP | 2009-267943 A | 11/2009 |
| WO | 93/09612 A1 | 5/1993 |
| WO | WO 03/028299 A1 | 4/2003 |
| WO | WO 2006/013638 A1 | 2/2006 |
| WO | WO 2008/114777 A1 | 9/2008 |

OTHER PUBLICATIONS

Office Action dated Dec. 26, 2016, by the Chinese Patent Office in corresponding Chinese Patent Application No. 201380077176.0 and partial English translation of the Office Action. (10 pages).
International Search Report (PCT/ISA/210) dated Aug. 20, 2013, by the Japanese Patent Office as the International Searching Authority for International Application No. PCT/JP2013/065987.
Written Opinion (PCT/ISA/237) issued on Aug. 20, 2013, by the Japanese Patent Office as the International Searching Authority for International Application No. PCT/JP2013/065987.
Office Action issued in the corresponding Taiwan Application No. 102141216 dated Apr. 1, 2015.
Second Office Action dated Aug. 30, 2017 issued by The State Intellectual Property Office of People's Republic of China in corresponding Chinese Patent Application No. 201380077176.0 and English translation (13 pages).

INTER-VEHICLE COMMUNICATION DEVICE

FIELD

The present invention relates to an inter-vehicle communication device that communicates a signal with another vehicle.

BACKGROUND

Regarding vehicles coupled to each other by using electrical couplers, a communication between the vehicles has been conventionally performed through an electric contact of the electrical coupler of each vehicle. Note here that in a condition where the vehicle is not coupled to another vehicle, an oxide film may be generated on a surface of the electrical coupler of each vehicle. When the vehicle is coupled to another vehicle under a condition that the oxide film is generated, a communication error in the communication between the vehicles is likely to be caused due to an influence of the oxide film.

As an example of a method for solving the above-mentioned problem, Patent Document 1 listed below discloses a technique that destroys an oxide film by applying a direct-current component to a contact portion of a connector. In a circuit in which a transmission amplifier is insulated by a transformer, the direct-current component is applied to the connector by connecting a direct-current voltage supply between the transformer and the connector.

CITATION LIST

Patent Literature

Patent Literature 1: JP H2-71621 A

SUMMARY

Technical Problem

However, according to the conventional technique mentioned above, the direct-current voltage supply and the transformer are connected via a capacitor on a sender side, which causes a problem that the transformer serves as a resistive component to disturb a signal waveform and thus a signal quality is deteriorated.

The present invention has been made in view of the above, and its object is to obtain an inter-vehicle communication device that can destroy an oxide film on an electrical coupler while suppressing deterioration of a signal quality.

Solution to Problem

To solve the above-mentioned problem and achieve the object, the present invention provides an inter-vehicle communication device of a vehicle provided with an electrical coupler that constructs a communication path with another vehicle by using an electric contact with said another vehicle. The inter-vehicle communication device has: a communication control means for controlling a communication with said another vehicle; a pulse transformer arranged between the communication control means and the electrical coupler; and a power supply device arranged between a middle point of the pulse transformer and the electrical coupler to apply a direct-current voltage to the electric contact between the electrical coupler and an electrical coupler of said another vehicle.

Advantageous Effects of Invention

The inter-vehicle communication device according to the present invention achieves an effect of being able to destroy an oxide film on the electrical coupler while suppressing deterioration of a signal quality.

DESCRIPTION OF EMBODIMENTS

Hereinafter, embodiments of an inter-vehicle communication device according to the present invention will be described in detail with reference to the drawings. It should be noted that the invention is not limited to the embodiments.

First Embodiment

Figure 1:
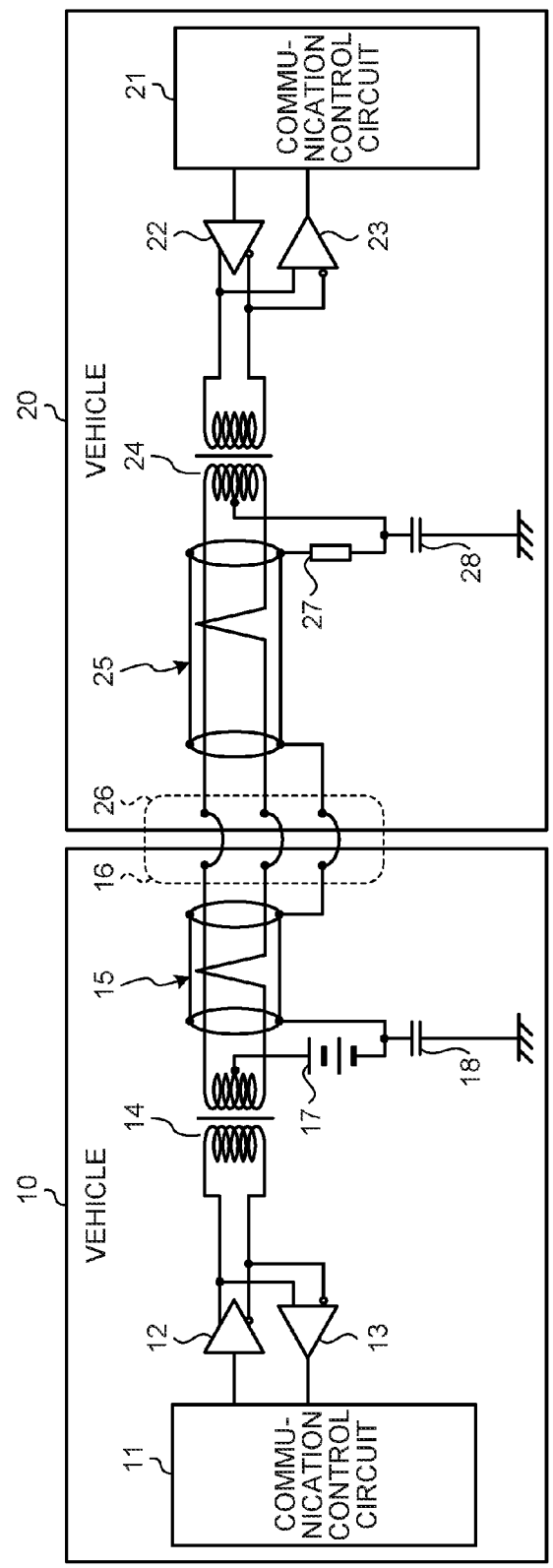
FIG. 1 is a diagram illustrating an example of a configuration of an inter-vehicle communication system of a first embodiment.

FIG. 1 is a diagram illustrating an example of a configuration of an inter-vehicle communication system according to the present embodiment. The inter-vehicle communication system is configured by a vehicle 10 and a vehicle 20. Here, the vehicle 10 applies a direct-current voltage to an electric contact of electrical couplers between the vehicle 10 and the vehicle 20.

A configuration of each vehicle will be described below. The vehicle 10 has, as its inter-vehicle communication device, a communication control circuit 11, a sender circuit 12, a receiver circuit 13, a pulse transformer 14, a shielded twisted pair cable 15, an electrical coupler 16, a power supply device 17, and a capacitor 18.

The communication control circuit 11 is a communication control means that controls a communication with a side of the vehicle 20. The sender circuit 12 is a sender unit that sends a signal to the side of the vehicle 20. The receiver circuit 13 is a receiver unit that receives a signal from the side of the vehicle 20. The pulse transformer 14 is arranged between a side of the communication control circuit 11, the sender circuit 12, and the receiver circuit 13 and a side of the electrical coupler 16, and direct-current insulates between the side of the signal sending/receiving circuit and the side of the electrical coupler 16. The shielded twisted pair cable 15 is a communication path from the pulse transformer 14 to the electrical coupler 16. The electrical coupler 16 is a connecting section with respect to the side of the vehicle 20, and constructs a communication path with respect to the vehicle 20 by using the electric contact with an electrical coupler of the vehicle 20. The power supply device 17 is arranged between a middle point of the pulse transformer 14 and the electrical coupler 16, and applies a direct-current voltage to the electric contact. The capacitor 18 direct-current insulates between a side of a vehicle body of the vehicle 10 and the signal path.

The vehicle 20 has, as its inter-vehicle communication device, a communication control circuit 21, a sender circuit 22, a receiver circuit 23, a pulse transformer 24, a shielded twisted pair cable 25, an electrical coupler 26, a load resistor 27, and a capacitor 28.

The communication control circuit 21 is a communication control means that controls a communication with a side of the vehicle 10. The sender circuit 22 is a sender unit that sends a signal to the side of the vehicle 10. The receiver circuit 23 is a receiver unit that receives a signal from the side of the vehicle 10. The pulse transformer 24 is arranged between a side of the communication control circuit 21, the sender circuit 22, and the receiver circuit 23 and a side of the electrical coupler 26, and direct-current insulates between the side of the signal sending/receiving circuit and the side of the electrical coupler 26. The shielded twisted pair cable 25 is a communication path from the pulse transformer 24 to the electrical coupler 26. The electrical coupler 26 is a connecting section with respect to the side of the vehicle 10, and constructs a communication path with respect to the vehicle 10 by using the electric contact with the electrical coupler 16 of the vehicle 10. The load resistor 27 is a resistor arranged between a middle point of the pulse transformer 24 and the electrical coupler 26. The capacitor 28 direct-current insulates between a side of a vehicle body of the vehicle 20 and the signal path.

As shown by the sender circuit 12, the receiver circuit 13, the sender circuit 22, and the receiver circuit 23 in FIG. 1, the communication between the vehicle 10 and the vehicle 20 is performed based on differential signals.

In FIG. 1, the power supply device 17 is connected to the load resistor 27 via the electrical coupler 16 of the vehicle 10 and the electrical coupler 26 of the vehicle 20. In a case where an oxide film is generated on the electrical couplers 16 and 26, the power supply device 17 can destroy the oxide film by applying the direct-current voltage to the electric contact between the electrical coupler 16 and the electrical coupler 26. The power supply device 17 is arranged at a position that is insulated from the vehicle body-side of the vehicle 10. Here, a shielded portion of the shielded twisted pair cable 15 serves as the path from the power supply device 17 to the electrical coupler 16.

Note that it may not be necessary to mount a dedicated battery as the power supply device 17. A battery (for example, 100V) mounted on the vehicle 10 or a 24V-voltage obtained by voltage conversion from the battery (100V) can be used as the power supply device 17.

As described above, according to the present embodiment, in the inter-vehicle communication device of the vehicle 10, the power supply device 17 for applying the direct-current voltage to the electric contact between the electrical coupler 16 of the vehicle 10 and the electrical coupler 26 of the vehicle 20 is arranged between the middle point of the pulse transformer 14 and the electrical coupler 16. As a result, a cause for disturbing a signal waveform can be eliminated, as compared with the conventional technique. It is therefore possible to destroy the oxide film generated on each electrical coupler while performing the communication between the vehicle 10 and the vehicle 20 with suppressing deterioration of a signal quality.

Second Embodiment

In the conventional technique and the first embodiment, the power supply device 17 constantly applies the direct-current voltage to the electric contact. The power supply device 17 continues applying the direct-current voltage even after the oxide film is destroyed, which causes waste of power. In the present embodiment, the oxide film is destroyed without wasting power. Portions different from the first embodiment will be described.

Figure 2:
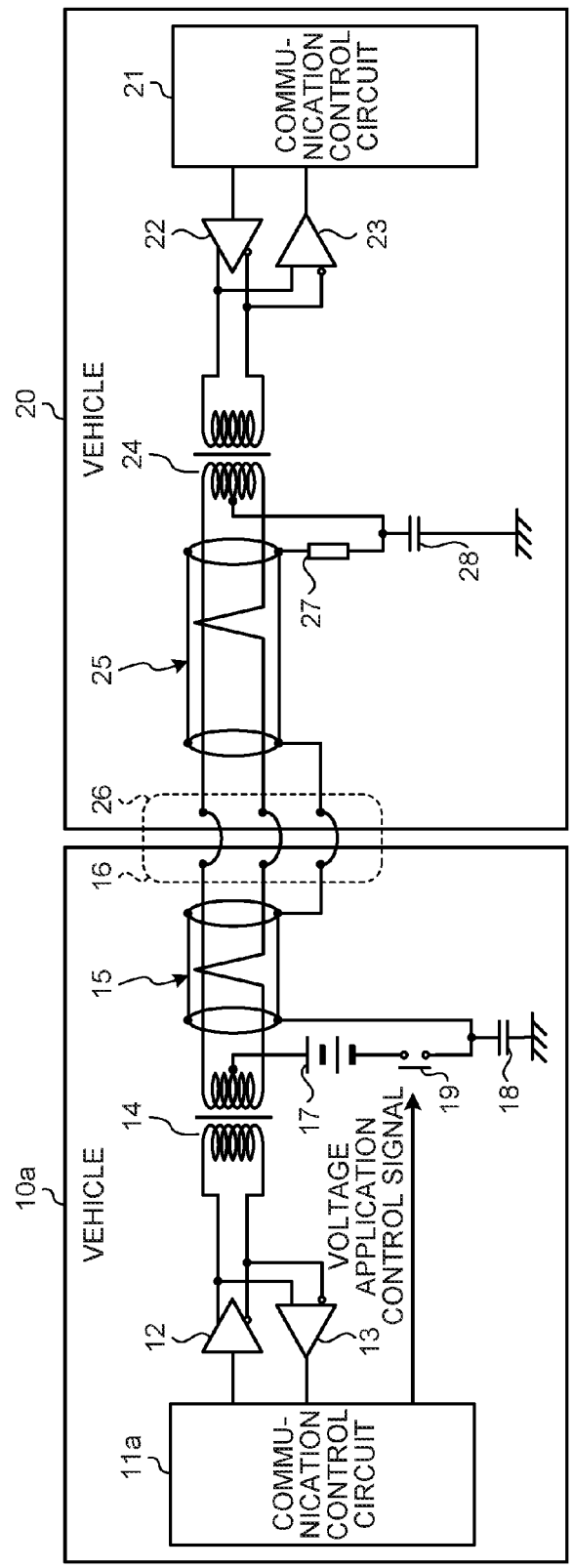
FIG. 2 is a diagram illustrating an example of a configuration of an inter-vehicle communication system of a second embodiment.

FIG. 2 is a diagram illustrating an example of a configuration of an inter-vehicle communication system according to the present embodiment. The inter-vehicle communication system is configured by a vehicle 10a and the vehicle 20. The vehicle 10a performs a control to apply a direct-current voltage to the electric contact of electrical couplers between the vehicle 10a and the vehicle 20. It should be noted that although a case in which only one of the vehicles (vehicle 10a) performs the control to apply the direct-current voltage will be described here, this is merely an example. It is also possible that both of the vehicles (vehicles 10a, 20) are configured to perform the control to apply the direct-current voltages, respectively.

A configuration of the vehicle 10a will be described below. The vehicle 10a has, as its inter-vehicle communication device, a communication control circuit 11a, the sender circuit 12, the receiver circuit 13, the pulse transformer 14, the shielded twisted pair cable 15, the electrical coupler 16, the power supply device 17, the capacitor 18, and a switch 19.

The communication control circuit 11a is a communication control means that controls a communication with a side of the vehicle 20. Moreover, the communication control circuit 11a can operate the switch 19 by using a voltage application control signal. The switch 19 is arranged between the power supply device 17 and the electrical coupler 16, and switches connection and disconnection between the power supply device 17 and the electrical coupler 16 in accordance with a control by the communication control circuit 11a.

In the present embodiment, the communication control circuit 11a of the vehicle 10a can control, by transmitting the voltage application control signal to operate the switch 19, a time in which the power supply device 17 applies the direct-current voltage to the electric contact between the electrical coupler 16 and the electrical coupler 26. By operating the switch 19 to connect the power supply device 17 and the electrical coupler 16, the communication control circuit 11a can apply the direct-current voltage to the electric contact. By operating the switch 19 to disconnect the power supply device 17 from the electrical coupler 16, the communication control circuit 11a can stop applying the direct-current voltage to the electric contact. That is, the communication control circuit 11a can apply the direct-current voltage to the electric contact during a period when the communication control circuit 11a operates the switch 19 to connect the power supply device 17 and the electrical coupler 16.

For example, the communication control circuit 11a operates, after the communication control circuit 11a is powered on, the switch 19 to apply the direct-current voltage from the power supply device 17 to the electric contact, and then after an elapse of a certain period of time, operates the switch 19 to stop applying the direct-current voltage to the electric contact. In a case where an oxide film is generated on the electrical couplers 16 and 26, the power supply device 17 can destroy the oxide film by the control by the communication control circuit 11a.

As another example, the communication control circuit 11a operates, when detecting coupling to the vehicle 20, the switch 19 to apply the direct-current voltage from the power supply device 17 to the electric contact, and then after an elapse of a certain period of time, operates the switch 19 to stop applying the direct-current voltage to the electric contact. In a case where an oxide film is generated on the electrical couplers 16 and 26, the power supply device 17 can destroy the oxide film by the control by the communication control circuit 11a.

As still another example, the communication control circuit 11a operates, when detecting a communication error in the communication with the vehicle 20, the switch 19 to apply the direct-current voltage from the power supply device 17 to the electric contact, and then after an elapse of a certain period of time, operates the switch 19 to stop applying the direct-current voltage to the electric contact. In a case where an oxide film is generated on the electrical couplers 16 and 26, the power supply device 17 can destroy the oxide film by the control by the communication control circuit 11a.

As still another example, let us consider a case where the vehicle 10a and the vehicle 20 periodically communicate with each other. One cycle is defined as a period from a time when a signal is sent by the sender circuit 12 of the vehicle 10a and received by the receiver circuit 23 of the vehicle 20 to a time when a signal is sent by the sender circuit 22 of the vehicle 20 and received by the receiver circuit 13 of the vehicle 10a. In this case, for every predetermined number of cycles, the communication control circuit 11a performs a procedure that operates the switch 19 to apply the direct-current voltage from the power supply device 17 to the electric contact, and then after an elapse of a certain period of time, operates the switch 19 to stop applying the direct-current voltage to the electric contact. In a case where an oxide film is generated on the electrical couplers 16 and 26, the power supply device 17 can destroy the oxide film by the control by the communication control circuit 11a.

Here, let us consider a case where the vehicle 10a and the vehicle 20 periodically performs a procedure (communication) in which a signal is sent by the sender circuit 12 of the vehicle 10a and received by the receiver circuit 23 of the vehicle 20 and a signal is sent by the sender circuit 22 of the vehicle 20 and received by the receiver circuit 13 of the vehicle 10a. In this case, the communication control circuit 11a may operate the switch 19 so as to apply the direct-current voltage from the power supply device 17 to the electric contact during a period from a time after the vehicle 10a completes reception of a signal to a time before the vehicle 10a starts sending a next signal.

Figure 3:
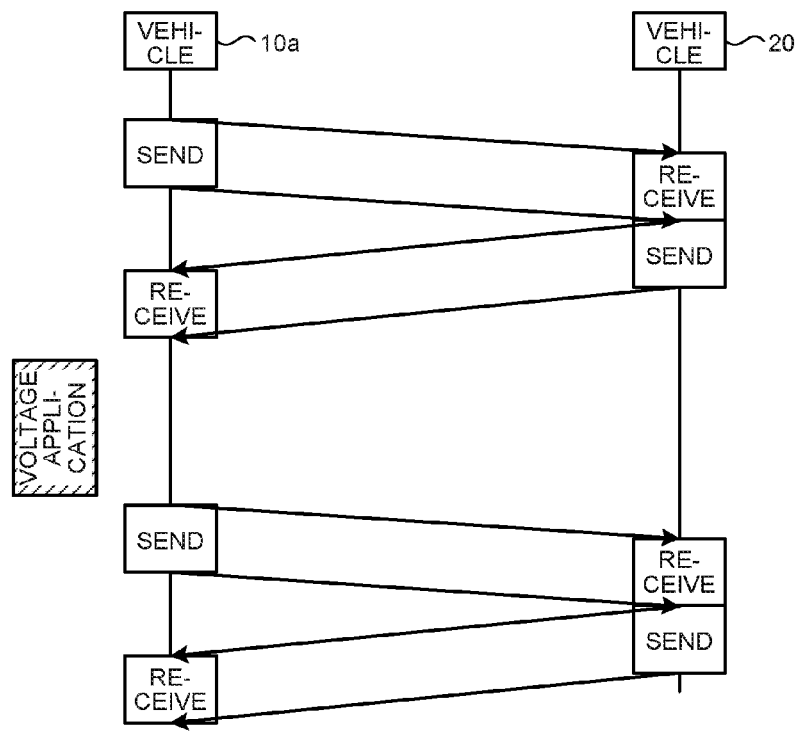
FIG. 3 is a diagram illustrating a time in which a direct-current voltage is applied to an electric contact.

FIG. 3 is a diagram illustrating a time in which the direct-current voltage from the power supply device is applied to the electric contact. As illustrated, the communication control circuit 11a applies the direct-current voltage from the power supply device 17 to the electric contact during a period between a previous communication and a subsequent communication.

Similarly, in a case where the vehicle 10a and the vehicle 20 periodically performs a procedure (communication) in which a signal is sent by the sender circuit 12 of the vehicle 10a and received by the receiver circuit 23 of the vehicle 20 and a signal is sent by the sender circuit 22 of the vehicle 20 and received by the receiver circuit 13 of the vehicle 10a, the communication control circuit 11a may operate the switch 19 so as to apply the direct-current voltage from the power supply device 17 to the electric contact during a period from a time before the vehicle 10a starts sending a signal to a time when the vehicle 10a completes reception of a signal.

In this case, when detecting a communication error with the vehicle 20 in the communication under the condition that the direct-current voltage is applied to the electric contact, the communication control circuit 11a may continue applying the direct-current voltage to the electric contact.

Figure 4:
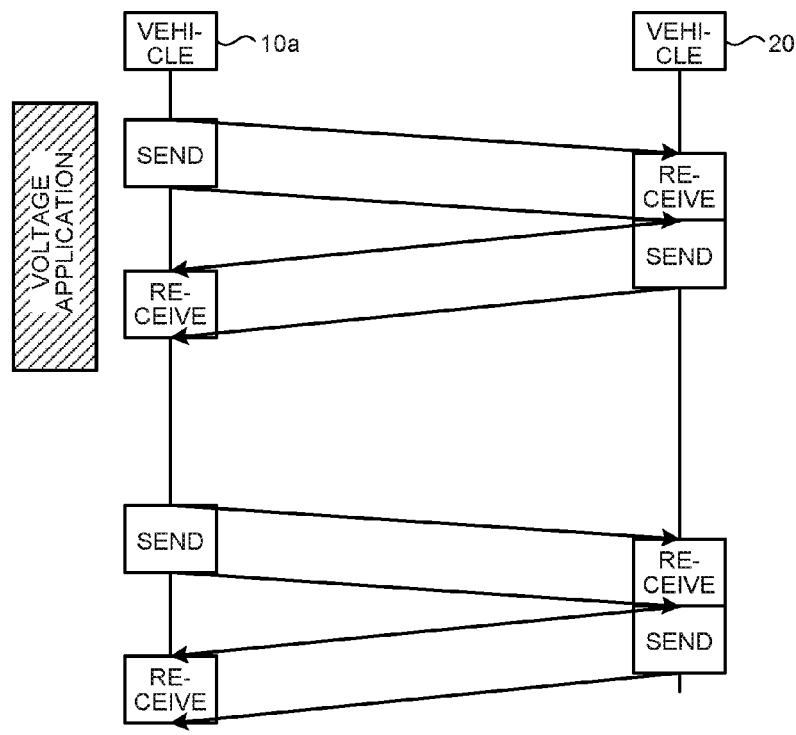
FIG. 4 is a diagram illustrating a time in which a direct-current voltage is applied to an electric contact.

FIG. 4 is a diagram illustrating a time in which the direct-current voltage from the power supply device is applied to the electric contact. As illustrated, the communication control circuit 11a applies the direct-current voltage from the power supply device 17 to the electric contact during a period when each communication is being performed.

As illustrated in FIG. 3 and FIG. 4, timings to start applying and stop applying the direct-current voltage from the power supply device 17 to the electric contact are designed such that the timings do not overlap time periods when the vehicles 10a, 20 perform the sending and receiving. In either case, the communication control circuit 11a can perform the control based on a timer not illustrated but provided in the vehicle, and thus the implementation can be achieved by a simple control.

As described above, according to the present embodiment, the communication control circuit 11a operates the switch 19 to apply the direct-current voltage from the power supply device 17 to the electric contact between the electrical coupler 16 of the vehicle 10a and the electrical coupler 26 of the vehicle 20, and thereby can destroy the oxide film generated on surfaces of the electrical couplers 16 and 26. Furthermore, the communication control circuit 11a can apply the direct-current voltage at timings such as after the communication control circuit 11a is powered on, when detecting coupling to the vehicle 20, when detecting a communication error in the communication with the vehicle 20, and the like. As a result, it is possible to destroy the oxide film without wasting power, in addition to the effects achieved in the first embodiment.

REFERENCE SIGNS LIST 10, 10a, 20 vehicle, 11, 11a, 21 communication control circuit, 12, 22 sender circuit, 13, 23 receiver circuit, 14, 24 pulse transformer, 15, 25 shielded twisted pair cable, 16, 26 electrical coupler, 17 power supply device, 18, 28 capacitor, 19 switch, 27 load resistor

The invention claimed is:

1. An inter-vehicle communication device of a vehicle provided with an electrical coupler that constructs a communication path with another vehicle by using an electric contact with said another vehicle, the inter-vehicle communication device comprising:
a communication control circuit controlling a communication with said another vehicle;
a pulse transformer arranged between the communication control circuit and the electrical coupler; and
a power supply device arranged between a middle point of the pulse transformer and the electrical coupler to apply a direct-current voltage to the electric contact between the electrical coupler and an electrical coupler of said another vehicle,
wherein the direct-current voltage is equally applied to each of a plurality of contacts of the electric contact.

2. The inter-vehicle communication device according to claim 1, further comprising:
a switch arranged between the power supply device and the electrical coupler to switch connection and disconnection between the power supply device and the electrical coupler, wherein the communication control circuit operates the switch to control a time in which the direct-current voltage is applied to the electric contact.

3. The inter-vehicle communication device according to claim 2,
wherein the communication control circuit operates, after the communication control circuit is powered on, the switch to apply the direct-current voltage to the electric contact, and then after an elapse of a certain period of time, operates the switch to stop applying the direct-current voltage to the electric contact.

4. The inter-vehicle communication device according to claim 2,
wherein the communication control circuit operates, when detecting coupling to said another vehicle, the switch to apply the direct-current voltage to the electric contact, and then after an elapse of a certain period of time, operates the switch to stop applying the direct-current voltage to the electric contact.

5. The inter-vehicle communication device according to claim 2,
wherein the communication control circuit operates, when detecting a communication error in a communication with said another vehicle, the switch to apply the direct-current voltage to the electric contact, and then after an elapse of a certain period of time, operates the switch to stop applying the direct-current voltage to the electric contact.

6. The inter-vehicle communication device according to claim 2,
wherein the vehicle and said another vehicle periodically communicate with each other,
wherein one cycle is defined as a period from a time when a signal is sent by the vehicle and received by said another vehicle to a time when a signal is sent by said another vehicle and received by the vehicle, and
wherein for every predetermined number of cycles, the communication control circuit performs a procedure that operates the switch to apply the direct-current voltage to the electric contact, and then after an elapse of a certain period of time, operates the switch to stop applying the direct-current voltage to the electric contact.

7. The inter-vehicle communication device according to claim 2,
wherein the vehicle and said another vehicle periodically performs a procedure in which a signal is sent by the vehicle and received by said another vehicle and a signal is sent by said another vehicle and received by the vehicle, and
wherein the communication control circuit operates the switch to control such that the direct-current voltage is applied to the electric contact during a period from a time after the vehicle completes reception of a signal to a time before the vehicle starts sending a next signal.

8. The inter-vehicle communication device according to claim 2,
wherein the vehicle and said another vehicle periodically performs a procedure in which a signal is sent by the vehicle and received by said another vehicle and a signal is sent by said another vehicle and received by the vehicle, and
wherein the communication control circuit operates the switch to control such that the direct-current voltage is applied to the electric contact during a period from a time before the vehicle starts sending a signal to a time when the vehicle completes reception of a signal.

9. The inter-vehicle communication device according to claim 8,
wherein when detecting a communication error with said another vehicle in a communication under a condition that the direct-current voltage is applied to the electric contact, the communication control circuit performs a control to continue applying the direct-current voltage to the electric contact.

10. The inter-vehicle communication device according to claim 1,
wherein the power supply device is insulated from a vehicle body of the vehicle.

11. The inter-vehicle communication device according to claim 1,
wherein a battery mounted on the vehicle or a voltage obtained by converting a voltage of the battery is used as the power supply device.

* * * * *